(12) United States Patent
Lopes

(10) Patent No.: US 11,193,716 B2
(45) Date of Patent: Dec. 7, 2021

(54) FLUID ROUTING METHODS FOR A SPIRAL HEAT EXCHANGER WITH LATTICE CROSS SECTION MADE VIA ADDITIVE MANUFACTURING

(71) Applicant: Fluid Handling LLC, Morton Grove, IL (US)

(72) Inventor: Jeffrey D. Lopes, Palatine, IL (US)

(73) Assignee: FLUID HANDLING LLC, Morton Grove, IL (US)

( * ) Notice: Subject to any disclaimer, the term of this patent is extended or adjusted under 35 U.S.C. 154(b) by 0 days.

(21) Appl. No.: 16/049,077

(22) Filed: Jul. 30, 2018

(65) Prior Publication Data

US 2019/0063842 A1    Feb. 28, 2019

Related U.S. Application Data

(60) Provisional application No. 62/538,214, filed on Jul. 28, 2017.

(51) Int. Cl.
| | |
|---|---|
| *F28D 7/00* | (2006.01) |
| *F28F 7/02* | (2006.01) |

(Continued)

(52) U.S. Cl.
CPC ............ *F28D 7/0033* (2013.01); *B33Y 80/00* (2014.12); *F28D 7/0016* (2013.01); *F28D 7/022* (2013.01);

(Continued)

(58) Field of Classification Search
CPC .... F28D 1/0472; F28D 1/0408; F28D 1/0426; F28D 1/047; F28D 7/0033; F28D 7/0066;

(Continued)

(56) References Cited

U.S. PATENT DOCUMENTS

| | | | |
|---|---|---|---|
| 2,251,066 A | * | 7/1941 | Persson ................... F28F 3/025 165/167 |
| 4,287,724 A | | 9/1981 | Clark |

(Continued)

FOREIGN PATENT DOCUMENTS

| | | | |
|---|---|---|---|
| CN | 106403694 A | * | 2/2017 |
| CN | 106403694 A | | 2/2017 |

(Continued)

OTHER PUBLICATIONS

Translation of German patent Document DE 3220957 A1 entitled Translation-DE 3220957 A1 (Year: 2019).*

(Continued)

*Primary Examiner* — Paul Alvare
(74) *Attorney, Agent, or Firm* — Ware, Fressola, Maguire & Barber LLP

(57) ABSTRACT

A spiral heat exchanger features: a cold fluid inlet manifold, a hot fluid inlet manifold and at least one spiral fluid pathway. The cold fluid inlet manifold receives cold fluid and provide cold inlet manifold fluid. The hot fluid inlet manifold receives hot fluid and provide hot inlet manifold fluid. The at least one spiral fluid pathway includes cold spiral pathways configured to receive the cold inlet manifold fluid and provide cold spiral fluid pathway fluid, and hot spiral pathways configured to receive the hot inlet manifold fluid and provide hot spiral fluid pathway fluid. The cold spiral pathways and the hot spiral pathways are configured in relation to one another to exchange heat between the cold spiral pathway fluid and the hot spiral pathway fluid so that the hot spiral fluid pathway fluid warms the cold spiral fluid pathway fluid, and vice versa.

4 Claims, 12 Drawing Sheets

(51) Int. Cl.
  *F28D 7/04* (2006.01)
  *F28D 7/02* (2006.01)
  *B33Y 80/00* (2015.01)
(52) U.S. Cl.
  CPC .................. *F28D 7/04* (2013.01); *F28F 7/02* (2013.01); *F28F 2255/18* (2013.01)
(58) Field of Classification Search
  CPC ... F28D 7/022; F28D 7/04; F28D 7/02; F28D 2001/028; B33Y 80/00
  See application file for complete search history.

(56) References Cited

U.S. PATENT DOCUMENTS

| | | | | |
|---|---|---|---|---|
| 4,479,533 | A * | 10/1984 | Persson | F25B 39/00 165/139 |
| 4,575,330 | A | 3/1986 | Hull | |
| 4,893,672 | A | 1/1990 | Bader | |
| 4,993,487 | A * | 2/1991 | Niggemann | F25B 39/00 165/163 |
| 5,242,015 | A * | 9/1993 | Saperstein | F28F 1/022 165/163 |
| 5,682,947 | A * | 11/1997 | McFarlane | F28D 7/04 165/163 |
| 6,926,873 | B1 * | 8/2005 | Filippi | B01J 8/0214 165/163 |
| 7,258,081 | B2 * | 8/2007 | Burch | B01B 1/005 122/31.1 |
| 8,029,501 | B2 | 10/2011 | Miller | |
| 9,450,311 | B2 | 9/2016 | Ng et al. | |
| 9,884,455 | B2 | 2/2018 | Huang et al. | |
| 9,937,665 | B2 | 4/2018 | Dudley | |
| 2002/0083733 | A1 * | 7/2002 | Zhang | F25B 40/00 62/503 |
| 2004/0230117 | A1 | 11/2004 | Tosaya et al. | |
| 2007/0084839 | A1 | 4/2007 | Zhang et al. | |
| 2009/0114380 | A1 * | 5/2009 | Grabon | F28D 7/0033 165/181 |
| 2012/0041428 | A1 | 2/2012 | Miller | |
| 2015/0174822 | A1 | 6/2015 | Huang et al. | |
| 2016/0116218 | A1 | 4/2016 | Shedd et al. | |
| 2016/0298213 | A1 | 10/2016 | Yang et al. | |
| 2017/0010046 | A1 * | 1/2017 | Hofbauer | F28F 9/0246 |
| 2017/0021565 | A1 | 1/2017 | Deaville | |
| 2017/0182561 | A1 | 1/2017 | Perez et al. | |
| 2017/0028631 | A1 | 2/2017 | Hyatt et al. | |
| 2017/0030651 | A1 * | 2/2017 | Rock, Jr. | F28D 7/022 |
| 2017/0182595 | A1 | 6/2017 | Nelson et al. | |
| 2017/0184108 | A1 | 6/2017 | Scancarello et al. | |
| 2017/0225403 | A1 | 8/2017 | Welch et al. | |
| 2017/0261087 | A1 | 9/2017 | White et al. | |
| 2017/0287685 | A1 | 10/2017 | Ferrasse et al. | |
| 2017/0292791 | A1 * | 10/2017 | Zaffetti | F28F 7/02 |
| 2017/0312821 | A1 | 11/2017 | Defelice et al. | |
| 2017/0370652 | A1 | 12/2017 | Lopes | |
| 2019/0033013 | A1 * | 1/2019 | Byfield | B22F 3/1055 |

FOREIGN PATENT DOCUMENTS

| | | | | |
|---|---|---|---|---|
| DE | 3220957 A1 * | 12/1983 | | F28D 7/04 |
| DE | 102005059667 A1 | 6/2007 | | |
| EP | 0061779 A2 * | 10/1982 | | B21D 53/027 |

OTHER PUBLICATIONS

Translation of European patent Document EP 0061779 A2 entitled Translation-EP 0061779 A2 (Year: 2019).*
Translation of Chinese patent Document CN 106403694 A entitled Translation-CN 106403694 A (Year: 2019).*
English language Abstract of CN106403694.
English language Abstract of DE10 2005 059 667.

* cited by examiner

FLUID ROUTING METHODS FOR A SPIRAL HEAT EXCHANGER WITH LATTICE CROSS SECTION MADE VIA ADDITIVE MANUFACTURING

CROSS-REFERENCE TO RELATED APPLICATIONS

This application claims benefit to provisional patent application Ser. No. 62/538,214, filed 28 Jul. 2017; which is incorporated by reference in its entirety.

This application is also related to U.S. patent application Ser. No. 15/618,466, filed 9 Jun. 2017, claiming benefit to provisional patent application Ser. No. 62/347,813, filed 9 Jun. 2016, which disclose 3D spiral heat exchangers and are both incorporated by reference in their entirety.

This application is also related to U.S. patent application Ser. No. 15/966,706, filed 30 Apr. 2018, claiming benefit to provisional patent application Ser. No. 62/491,325, filed 28 Apr. 2017, which disclose another work by the instant inventor related to using additive manufacturing, and are both incorporated by reference in their entirety.

BACKGROUND OF THE INVENTION

1. Field of Invention

This invention relates to a heat exchanger; and more particularly, to a heat exchanger to lower or raise the temperature of a fluid by facilitating heat transfer between that fluid with another fluid at a different temperature.

2. Description of Related Art

A heat exchanger is a device whose purpose is to lower or raise the temperature of a fluid by facilitating heat transfer between that fluid with another fluid at a different temperature. There are several types of heat exchangers available that vary in heat transfer capability; geometrical design and complexity; cost; working fluid temperature, pressure, and viscosity ranges; and many other attributes.

Common types of heat exchangers include double pipe; shell and tube; and plate and frame. A less common type is the spiral heat exchanger. This heat exchanger is composed of sheet metal coiled in a spiral pattern to form a single channel for hot fluid and a single channel for cold fluid. The hot fluid typically enters at the center of the heat exchanger and flows outward to the periphery of the exchanger and the cold fluid flows in the opposite direction.

This type of heat exchanger has many advantages over the aforementioned types. The spiral channel creates an even velocity distribution throughout the flow path with no dead spots in the flow. This means that, not only will the fluid flow more efficiently, but there is also no particular region that would encourage the deposition of solids or fouling, in fact the design in self-cleaning. Any fouling that occurs will cause a local increase in fluid velocity which will act to clean the fouled area. Due to this the spiral heat exchanger is used with viscous fluids and in situations in which there are particles suspended in the working fluid.

The curvature of the spiral heat exchanger created a secondary flow between the inner and outer portions of the flow path and ensures highly turbulent fluid flow throughout the device even at low Reynolds Numbers. The secondary flow increases mixing which also enhances heat transfer and, due to the constantly changing curvature, the temperature distribution is even throughout the device—There are no hot and cold spots as with other heat exchanger types.

The constantly changing curvature of the spiral heat exchanger also ensures highly turbulent fluid flow throughout the path. This increases mixing which also enhances heat transfer and the due to the constant changing the temperature distribution is even throughout the device—There are no hot and cold spots as with other heat exchanger types which further improves the exchanger's performance.

The spiral heat exchanger provides the highest heat transfer to size ratio of any type that exists today and oversizing the exchanger can result in a lower pressure drop, less required pumping energy, higher thermal efficiency, and lower energy costs compared with other heat exchanger types.

There are also disadvantages to this type of heat exchanger. First, its relatively complex geometry usually results in a higher cost. Second, the large single channels limit the area available for heat transfer and the pressure range for the device.

In view of the aforementioned, there is a need in the industry for a better heat exchanger.

SUMMARY OF THE INVENTION

The present invention is a continuation or further development of heat exchanger technology disclosed in the aforementioned U.S. patent application Ser. No. 15/618,466 and provisional patent application No. 62/347,813. The present invention expands on this heat exchanger technology, e.g., by providing examples of how to route fluid to each of its pathways.

This disclosure discloses examples of two methods/techniques in which fluid can be routed to the pathways.

Specific Embodiments

By way of example, the present invention provides a new and unique spiral heat exchanger featuring: a cold fluid inlet manifold, a hot fluid inlet manifold and at least one spiral fluid pathway.

The cold fluid inlet manifold may be configured to receive cold fluid and provide cold inlet manifold fluid.

The hot fluid inlet manifold may be configured to receive hot fluid and provide hot inlet manifold fluid.

The at least one spiral fluid pathway may include cold spiral pathways configured to receive the cold inlet manifold fluid and provide cold spiral fluid pathway fluid, and hot spiral pathways configured to receive the hot inlet manifold fluid and provide hot spiral fluid pathway fluid. The cold spiral pathways and the hot spiral pathways may be configured in relation to one another to exchange heat between the cold spiral pathway fluid and the hot spiral pathway fluid so that the hot spiral fluid pathway fluid warms the cold spiral fluid pathway fluid, and vice versa.

The spiral heat exchanger may include one or more of the following additional features:

The heat exchanger may include a cold fluid outlet manifold and a hot fluid outlet manifold. The cold fluid outlet manifold may be configured to receive the cold spiral fluid pathway fluid and provide cold fluid outlet manifold fluid, including to a cold fluid outlet. The hot fluid outlet manifold may be configured to receive the hot spiral fluid pathway fluid and provide hot fluid outlet manifold fluid, including to a hold fluid outlet.

The heat exchanger may include cold inlet route paths or pathways configured to receive the cold fluid and provide cold inlet route paths or pathways fluid. The cold fluid inlet manifold may be configured to receive the cold inlet route paths or pathways fluid as the cold fluid from the cold inlet route paths or pathways.

The heat exchanger may include hot inlet route paths or pathways configured to receive the hot fluid and provide hot inlet route paths or pathways fluid. The hot fluid inlet manifold may be configured to receive the hot inlet route paths or pathways fluid as the hot fluid from the hot inlet route paths or pathways.

The at least one spiral fluid pathway may include two spiral fluid pathways having a cold spiral pathway and a hot spiral pathway arranged in relation to one another.

The cold spiral pathway and the hot spiral pathway may be arranged respectively on top and bottom portions of the heat exchanger.

The cold fluid inlet manifold may include a channeling block having a first portion with a first face configured to receive the cold fluid and provide the cold inlet manifold fluid to some pathway rows of the at least one spiral fluid pathway that form the cold spiral pathways, and also having a second portion with a second face configured to receive the hot fluid and provide the hot inlet manifold fluid to remaining pathway rows of the at least one spiral fluid pathway that form the hot spiral pathways.

The first face and the second face may be angled in opposite directions.

The first face and the second face may include respective channels/openings configured or formed therein to allow fluid flow.

The cold fluid inlet manifold may be configured on an inner/central portion of the heat exchanger; and the hot fluid inlet manifold may be configured on an outer/peripheral portion of the heat exchanger.

The at least one spiral fluid pathway may include, or take the form of, an integral spiral fluid pathway having a cold spiral pathway and a hot spiral pathway interwoven in relation to one another.

The integral spiral fluid pathway may include pathway rows and channels; and the cold spiral pathway and the hot spiral pathway may configured and interwoven in alternating pathway rows and channels, e.g., including cold spiral fluid pathways in every other pathway row and hot spiral fluid pathways in every other remaining pathway row, cold spiral fluid pathways in every other pathway column and hot spiral fluid pathways in every other remaining pathway column, cold spiral fluid pathways in every other pathway row and column and hot spiral fluid pathways in every other remaining pathway row and column (e.g., like a checker board pattern or honeycomb configuration), etc.

The heat exchanger may be made or manufacturer in whole or in part using an additive manufacturing process.

BRIEF DESCRIPTION OF THE DRAWING

The drawing includes FIGS. 1-12, which are not necessarily drawn to scale, and include the following.

DETAILED DESCRIPTION OF BEST MODE OF THE INVENTION

Example of an Embodiment

Figure 1:
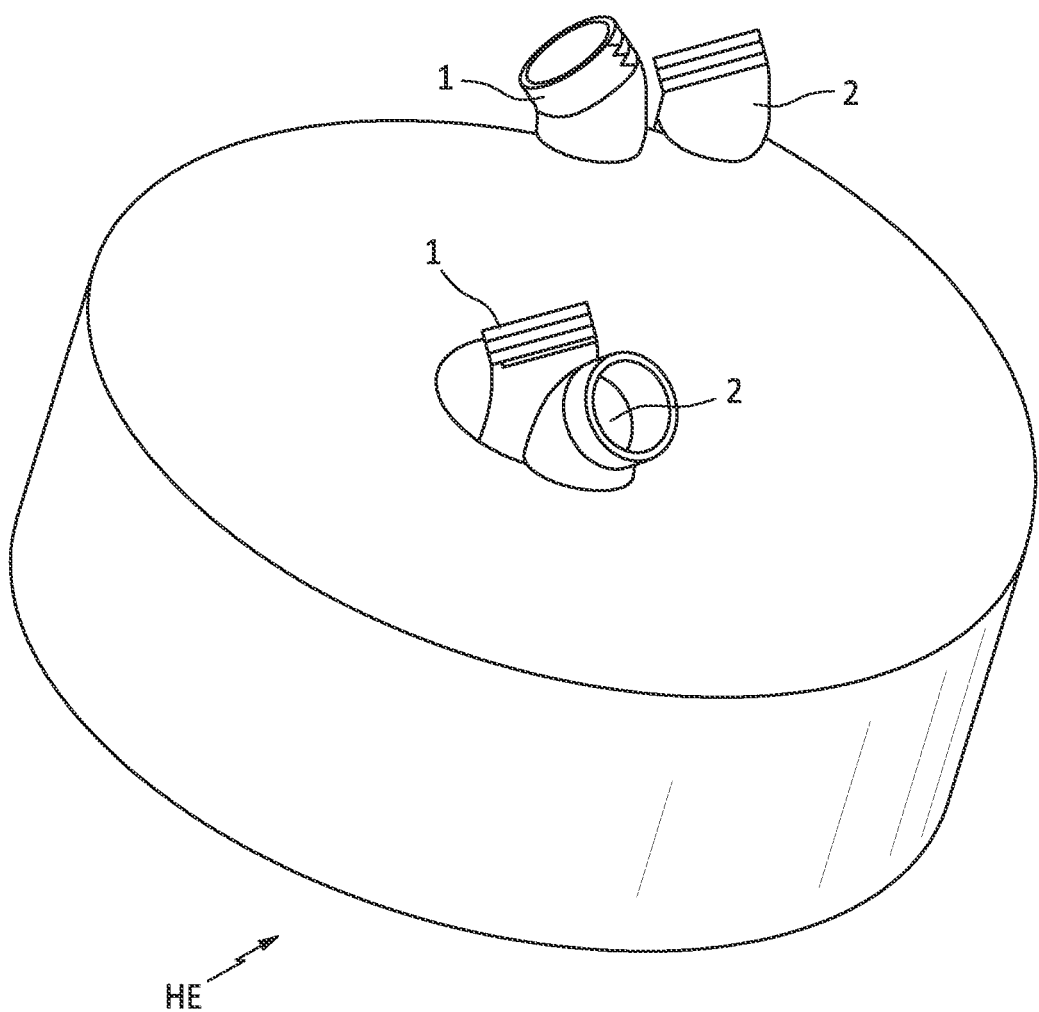
FIG. 1 is a diagram of a perspective view a heat exchanger, e.g. showing a cold fluid and a hot fluid routed through the heat exchanger or device in a counterflow arrangement, where the cold fluid is routed in a cold fluid path (1) from a cold water inlet formed in a central part of the heat exchanger, spiraling through the heat exchanger, to a cold water outlet formed on an outer peripheral part of the heat exchanger, and where the hot fluid is routed in a hot fluid path (2) from a hot water inlet formed on an outer peripheral part of the heat exchanger, spiraling through the heat exchanger, to a hot water outlet formed on a central part of the heat exchanger, according to some embodiments of the present invention.
Figure 2:
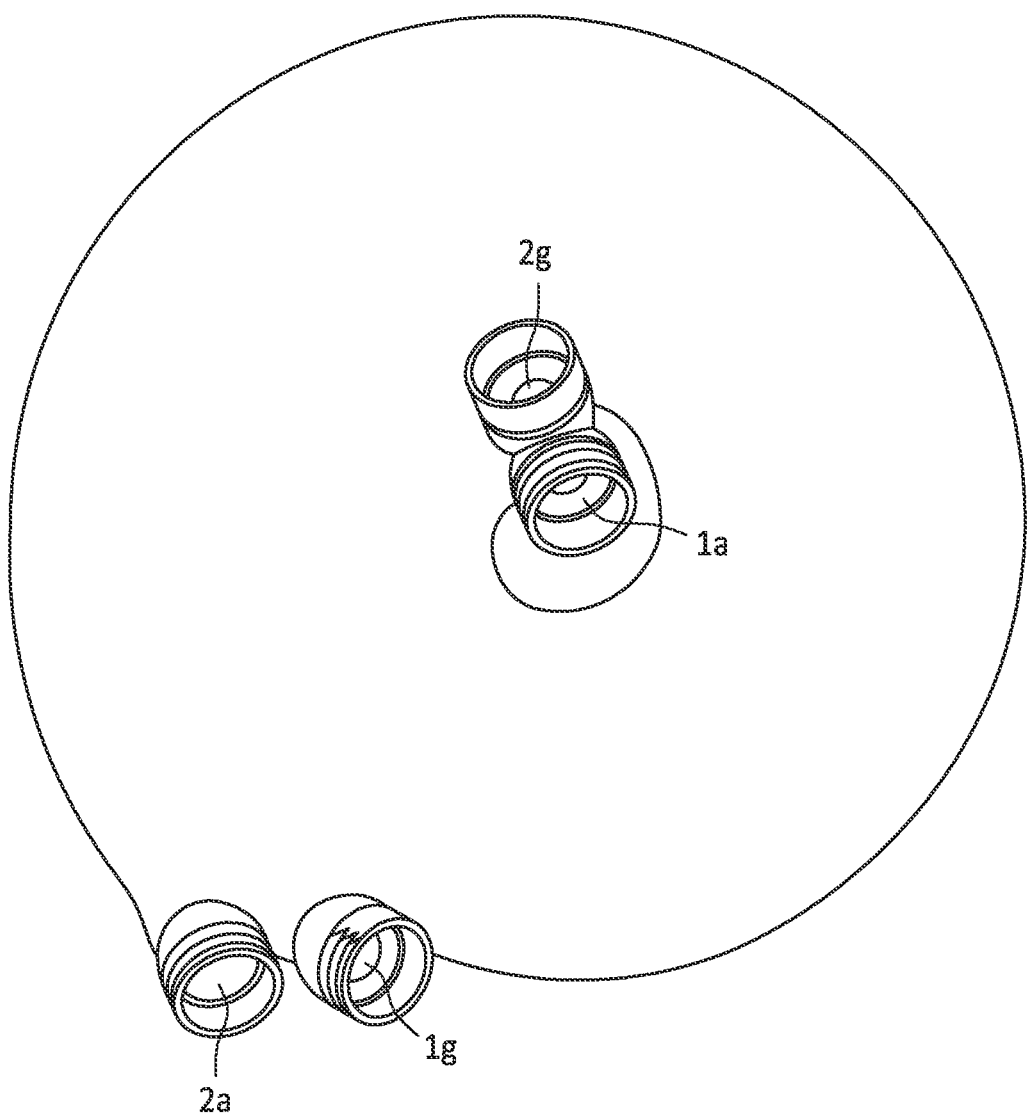
FIG. 2 is a diagram of a top down view of the heat exchanger or device shown in FIG. 1.

FIGS. 1-12 show two new and unique methods/techniques to route fluids to heat exchanger paths, as follows:

FIGS. 1-6

FIGS. 1-6 show a first method/technique that has the following components for each fluid path (1) and (2): A cold/hot fluid inlet (1a, 2a), a cold/hot inner/inlet route path (1b, 2b), a cold/hot inner/inlet manifold (1c, 2c), a cold/hot spiral fluid pathway (1d, 2d), a cold/hot outer/outlet manifold (1e, 2e), a cold/hot outer/outlet route path (1f, 2f), and a cold/hot fluid outlet (1g, 2g).

Figure 3:
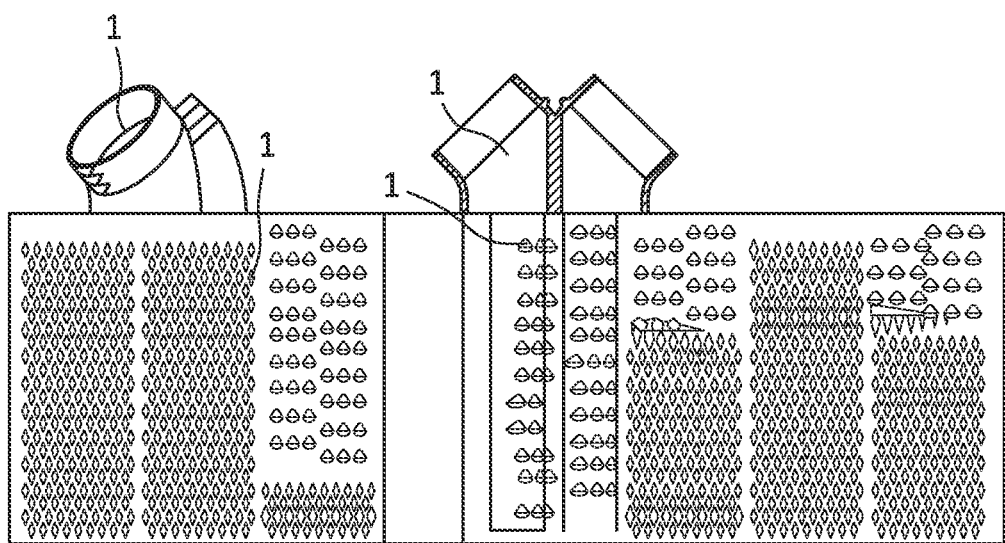
FIG. 3 is a diagram of a cross-sectional view cut along and parallel to a top-to-bottom axis of the heat exchanger shown in FIG. 1.

The function of this device will be described, e.g., by assuming that a hot fluid and cold fluid are being routed through the heat exchanger (HE) in a counterflow arrangement with the cold fluid being routed from the inside of the device towards the outside of the device in the cold fluid path generally indicated as (1), e.g., as shown in FIGS. 1 and 3, and the hot fluid being routed from the outside towards the inside in the hot fluid path generally indicated as (2) also shown in FIG. 1. Embodiments are envisioned, and the scope of the scope of the invention is intended to include, implementations where the hot fluid and cold fluid are being routed through the heat exchanger (HE) in a counterflow arrangement with the cold fluid being routed from the outside of the device towards the inside of the device in the cold fluid path generally indicated as (1) and the hot fluid being routed from the inside towards the outside in the hot fluid path generally indicated as (2).

Figure 4:
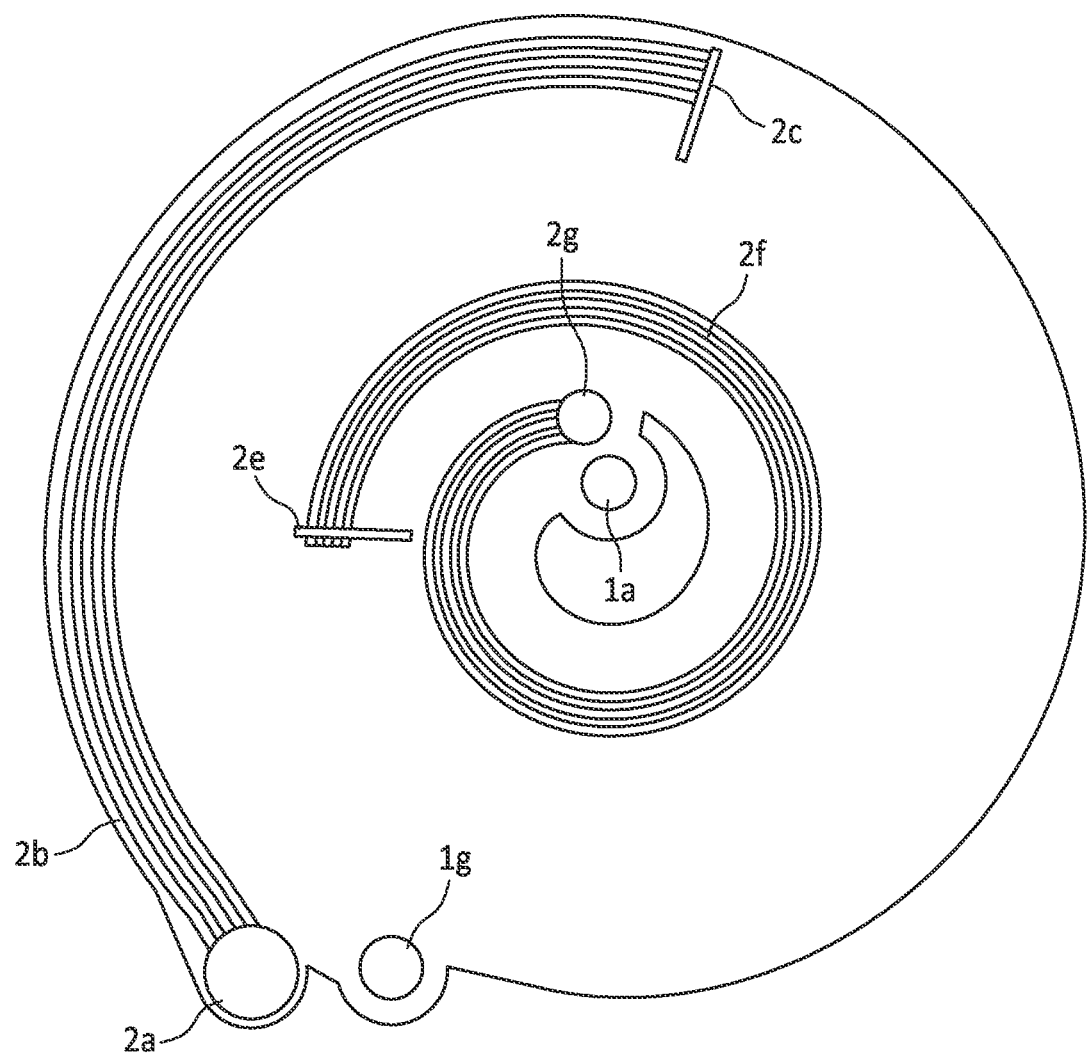
FIG. 4 is a diagram of a cross-section view cut along and transverse to a top-to-bottom axis of the heat exchanger like that shown in FIG. 1, showing of an example of parts of the hot fluid path (2), e.g., including a hot fluid inlet (2a), a hot fluid inner route path (2b), a hot fluid inner manifold (2c), a hot fluid outer manifold (2e), a hot fluid outer route path (2f) and a hot fluid outlet (2g), as well as parts of the cold fluid path (1), e.g. including a cold fluid inlet (1a) and a cold fluid outlet (1g), according to some embodiments of the present invention.
Figure 5:
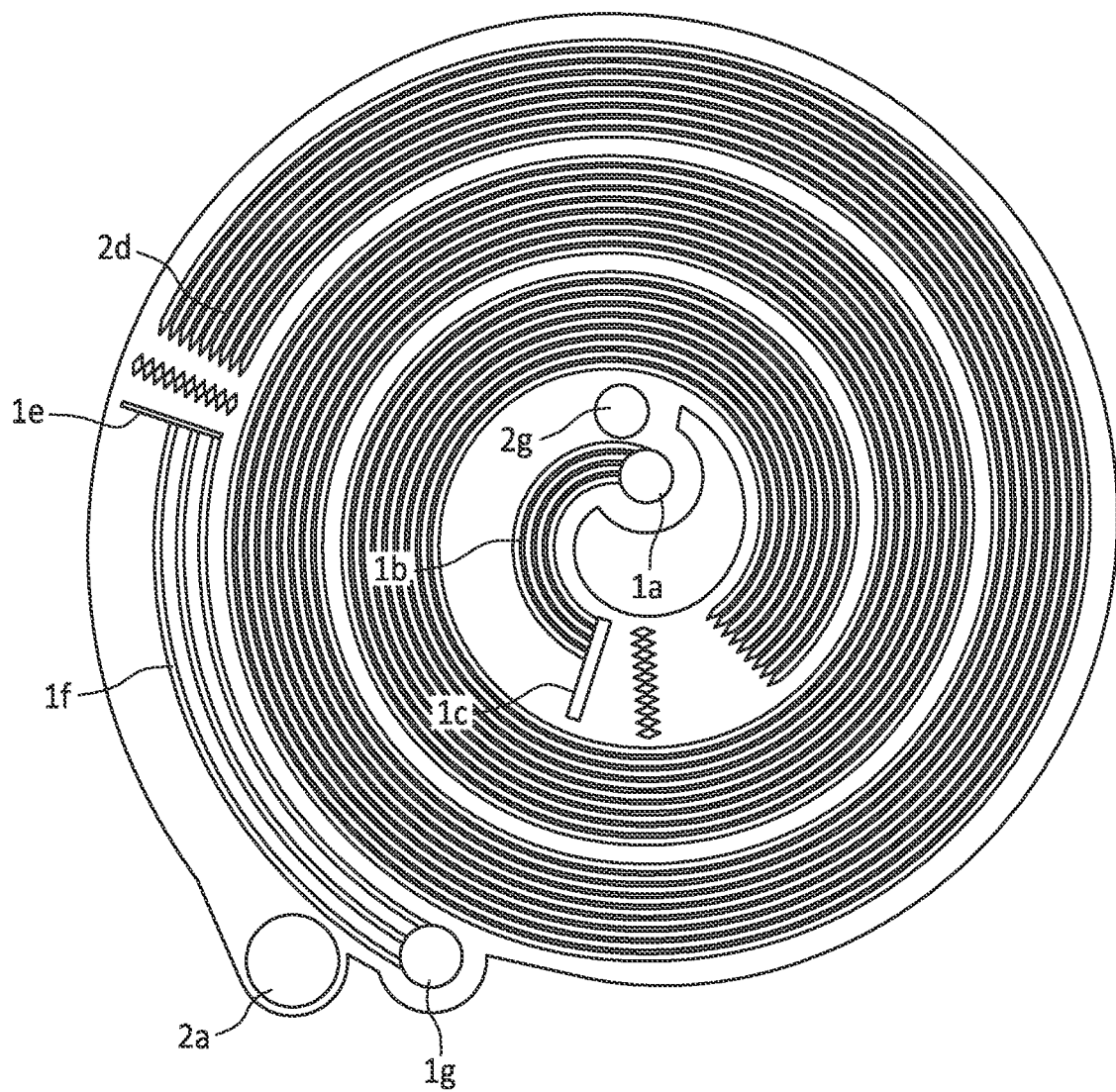
FIG. 5 is a diagram of a cross-section view cut along and transverse to a top-to-bottom axis of the heat exchanger like that shown in FIG. 1, showing an example of parts of the cold fluid path (1), e.g., including a cold fluid inlet (1a), a cold fluid inner route path (1b), a cold fluid inner manifold (1c), a cold fluid outer manifold (1e), a cold fluid outer route path (1f) and a cold fluid fluid outlet (1g), as well as parts of the hot fluid path (2), e.g. including a hot fluid inlet (2a), a hot fluid spiral fluid pathway (2d) and a hot fluid outlet (2g), according to some embodiments of the present invention.
Figure 6:
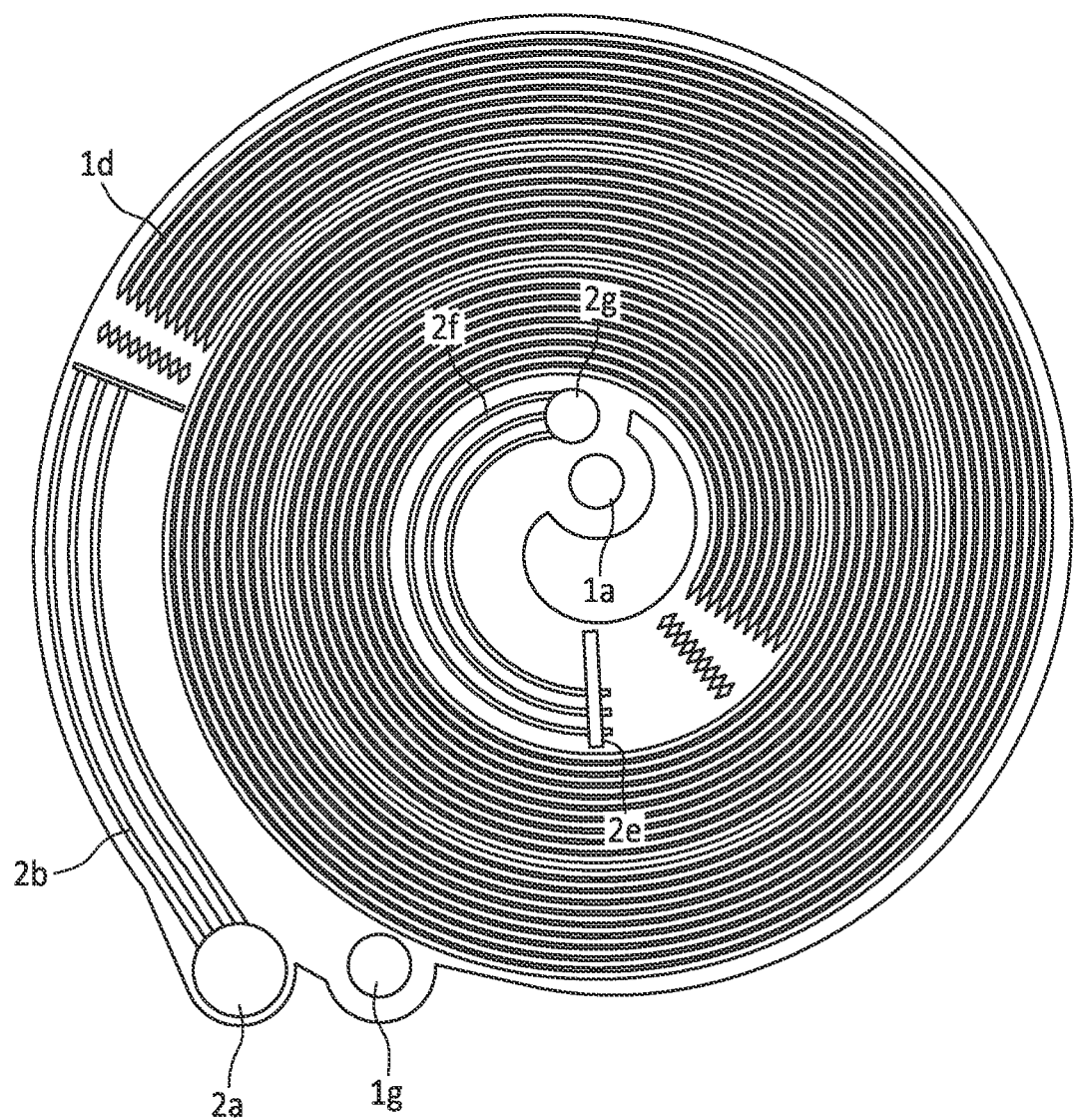
FIG. 6 is a diagram of a cross-section view cut along and transverse to a top-to-bottom axis of the heat exchanger like that shown in FIG. 1, showing an example of parts of the cold fluid path (1), e.g., including a cold fluid inlet (1a), a cold fluid spiral fluid pathway (2d) and a cold fluid outlet (1g), as well as parts of the hot fluid path (2), e.g. including a hot fluid inlet (2a), a hot fluid fluid inner route path (2b), a hot fluid outer manifold (2e), a hot fluid outer route path (2f) and a hot fluid outlet (2g), according to some embodiments of the present invention.
Figure 7:
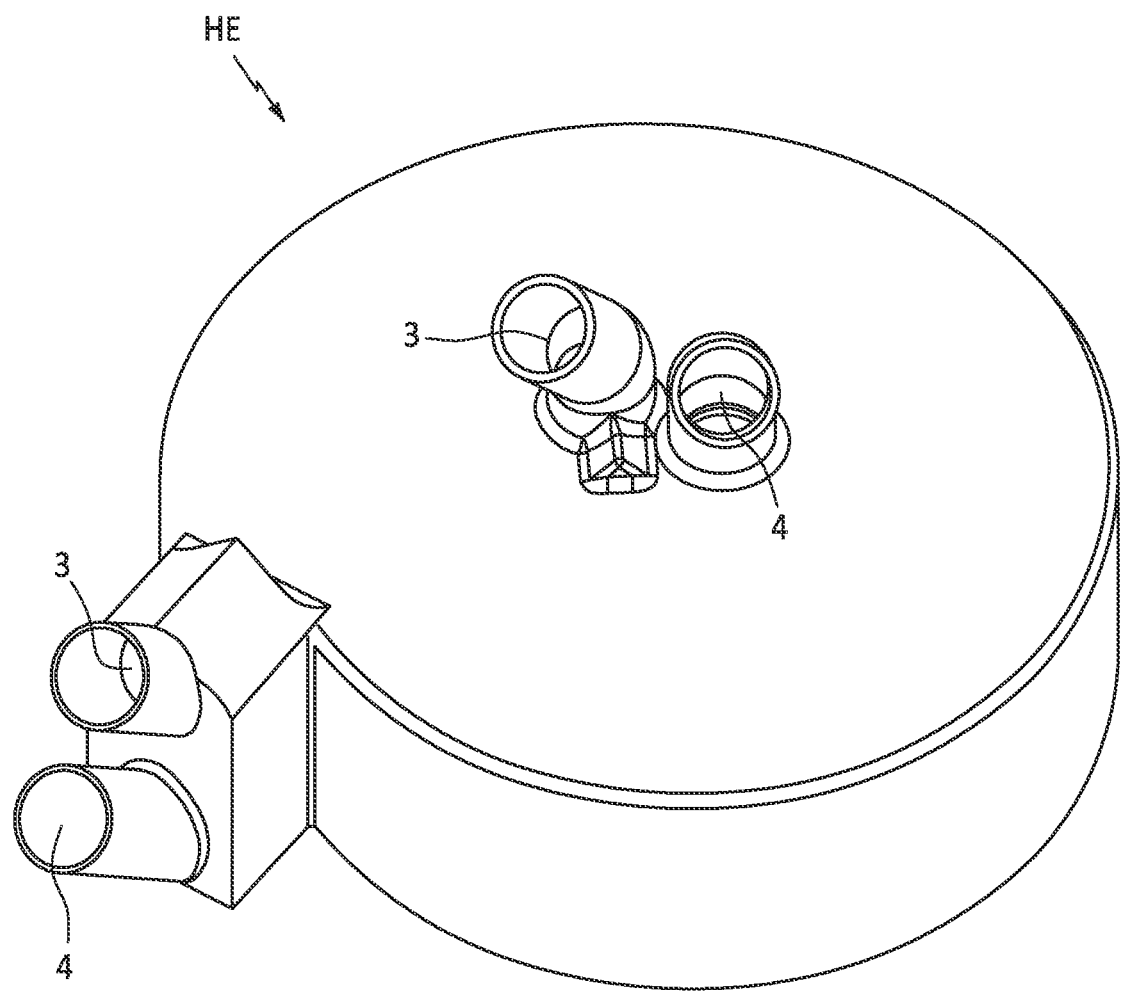
FIG. 7 is a diagram of a perspective view a heat exchanger, e.g. showing a cold fluid and a hot fluid routed through the heat exchanger or device in a counterflow arrangement, where the cold fluid is routed in a cold fluid path (3) from a cold water inlet formed in a peripheral part of the heat exchanger, spiraling through the heat exchanger, to a cold water outlet formed on a central part of the heat exchanger, and where the hot fluid is routed in a hot fluid path (4) from a hot water inlet formed on a central part of the heat exchanger, spiraling through the heat exchanger, to a hot water outlet formed on a peripheral part of the heat exchanger, according to some embodiments of the present invention.
Figure 8:
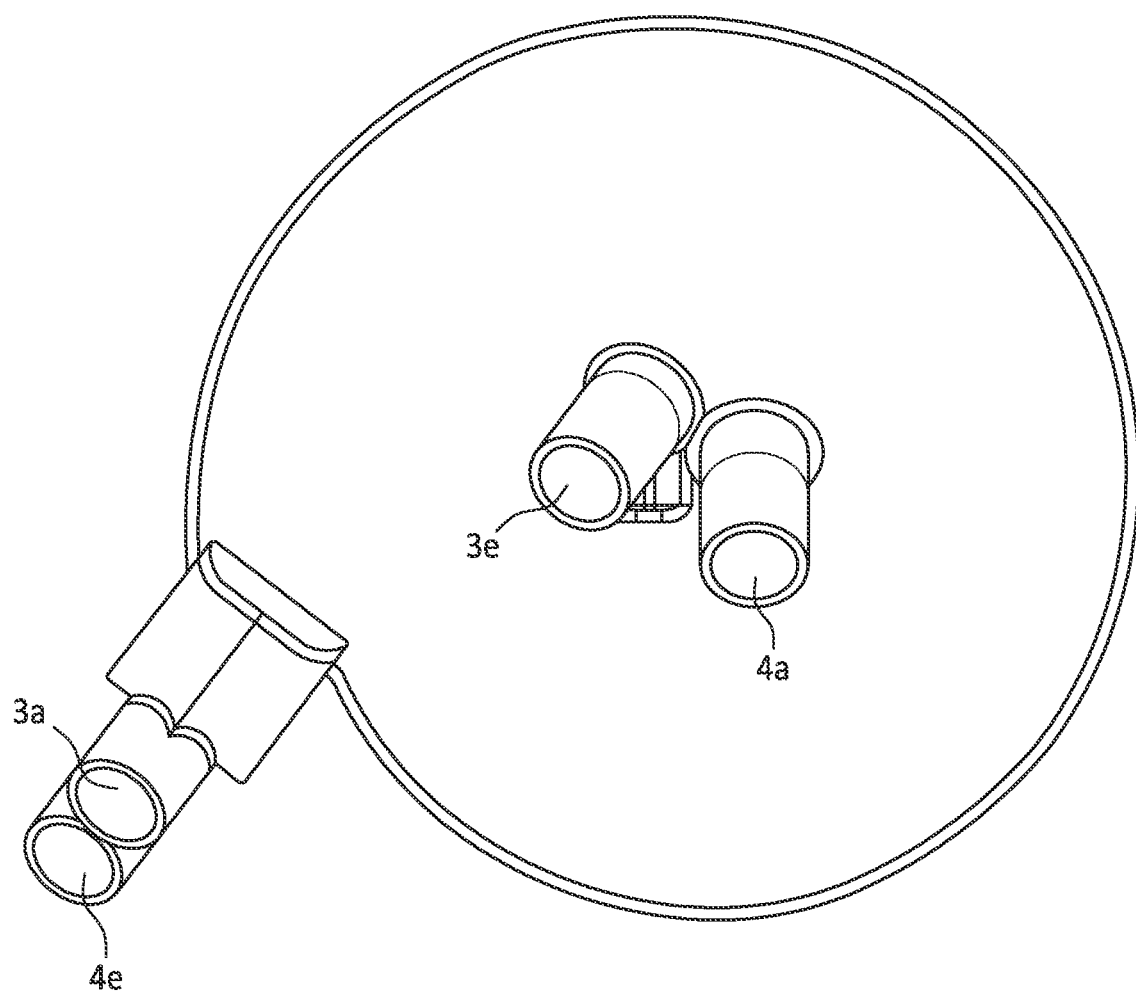
FIG. 8 is a diagram of a top down view of the heat exchanger or device shown in FIG. 1, e.g., showing a cold water inlet (3a), a cold water outlet (3e), a hot water inlet (4a) and a hot water outlet (4e).
Figure 9:
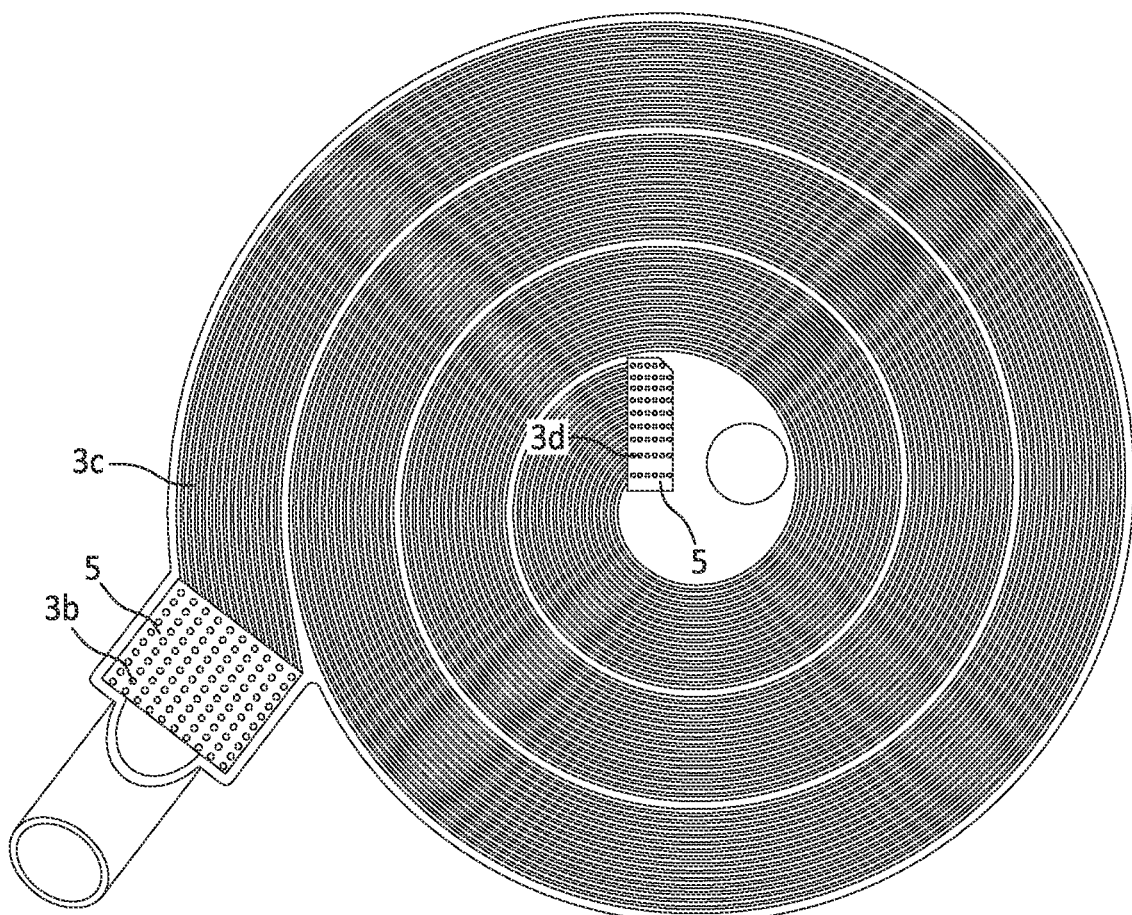
FIG. 9 is a diagram of a cross-section view cut along and transverse to a top-to-bottom axis of the heat exchanger like that shown in FIG. 7, showing an example of parts of the cold fluid path (3), e.g., including a cold fluid inlet channeling block channel (3b), a cold fluid spiral pathway (3c), a cold fluid outlet channeling block channel (3d), and channeling blocks (5), according to some embodiments of the present invention.
Figure 10:
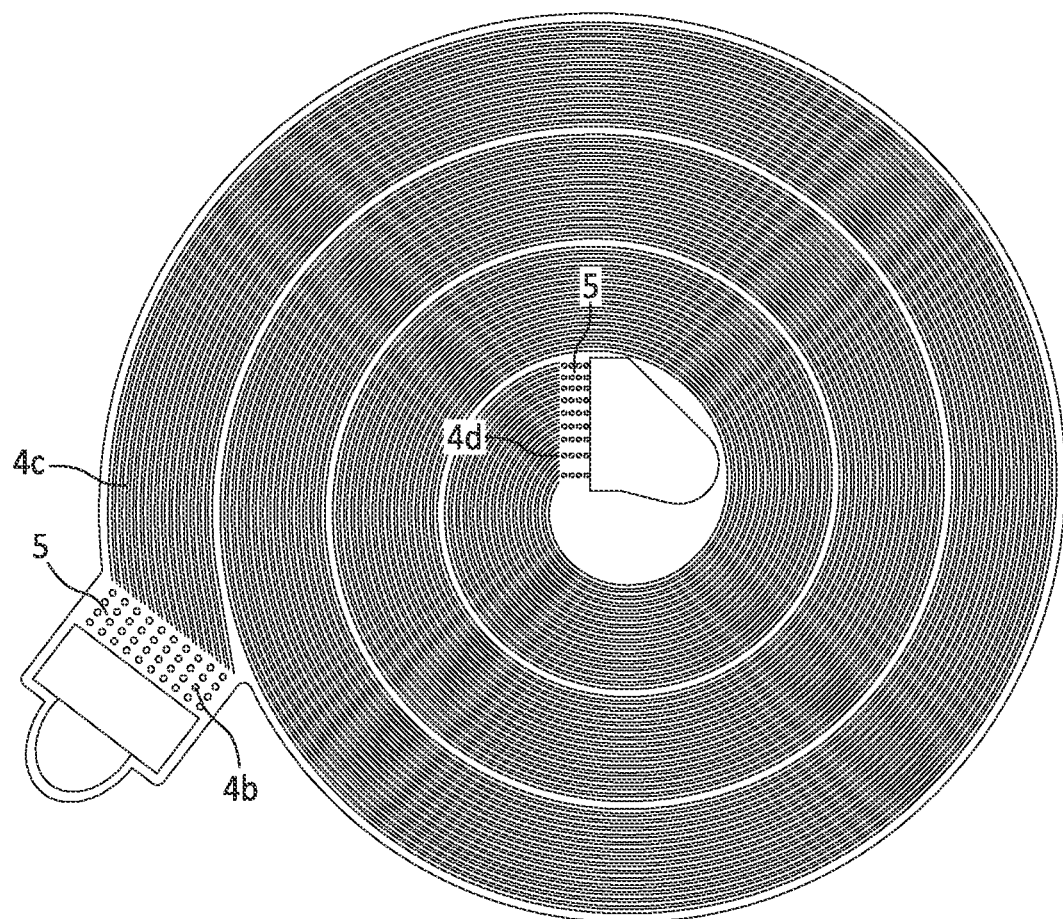
FIG. 10 is a diagram of a cross-section view cut along and transverse to a top-to-bottom axis of the heat exchanger like that shown in FIG. 7, showing an example of parts of the hot fluid path (4), e.g., including a hot fluid inlet channeling block channel (4b), a hot fluid spiral pathway (4c), a hot fluid outlet channeling block channel (4d), and channeling blocks (5), according to some embodiments of the present invention.
Figure 11:
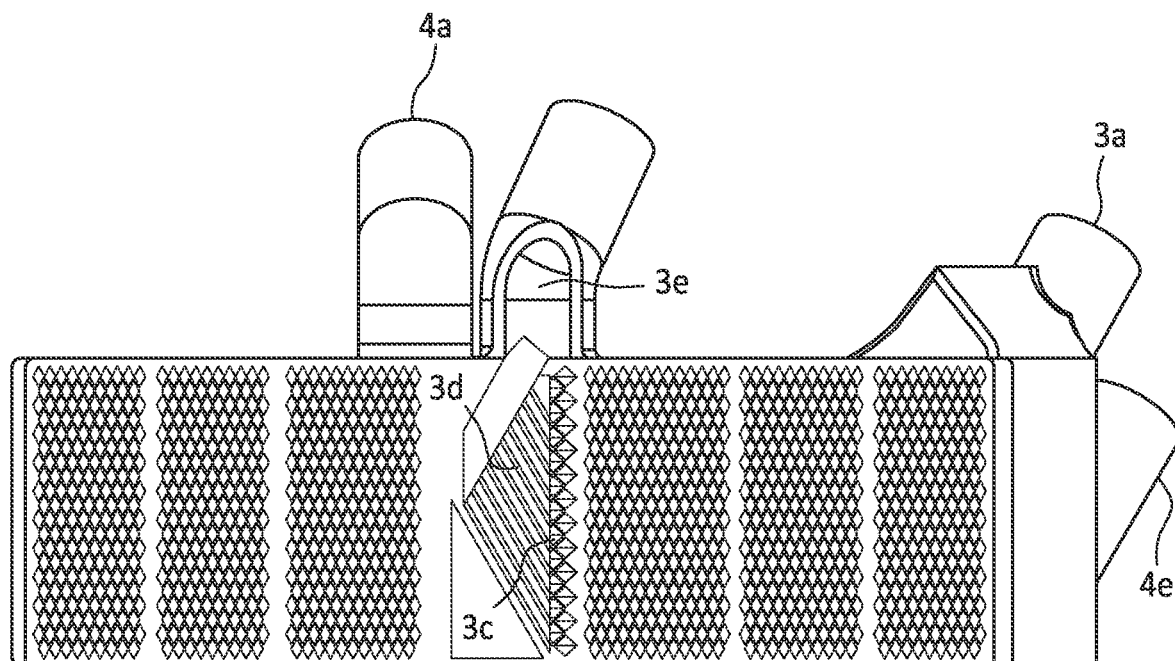
FIG. 11 is a diagram of a cross-section view cut along and parallel to a top-to-bottom axis of the heat exchanger like that shown in FIG. 7, showing an example of parts of the cold fluid path (3), e.g., including a cold fluid spiral pathway (3c), a cold fluid outlet channeling block channel (3d), and a cold water outlet (3e), according to some embodiments of the present invention.
Figure 12:
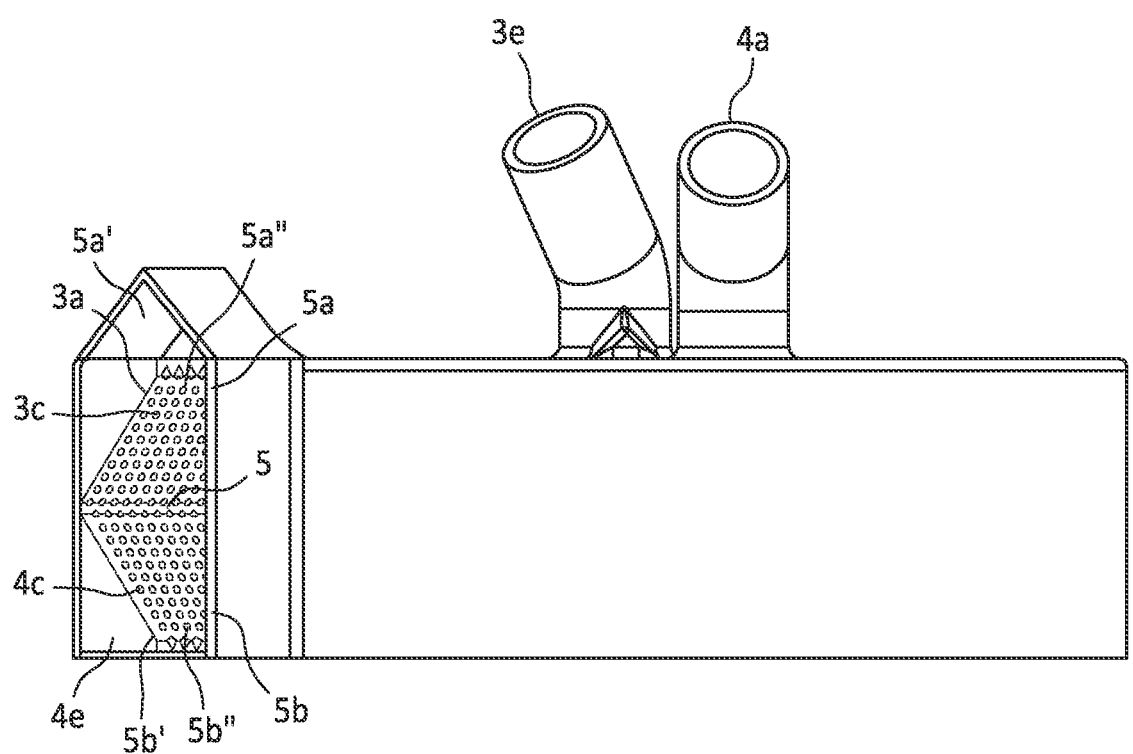
FIG. 12 is a diagram of a cross-section view cut along and parallel to a top-to-bottom axis of the heat exchanger like that shown in FIG. 7, showing an example of parts of the cold fluid path (3), e.g., including a cold water inlet (3a) and a cold fluid spiral pathway (3c), as well as an example of parts of the hot fluid path (4), e.g., including a hot fluid spiral pathway (4c) and a hot water outlet (4e), separated by a channel block (5), according to some embodiments of the present invention.

By way of example, and consistent with that shown in FIGS. 4-6, the cold fluid enters the device through the cold fluid inlet (1a), e.g., which is a tubular section near the center of the device. The cold fluid inlet (1a) breaks the bulk fluid flow up into multiple smaller pathways that comprise the cold inner route paths (1b), which carry the fluid to the cold inner manifold (1c) and distribute the fluid to the cold spiral fluid pathways (1d), e.g. where the heat exchange occurs. After the cold fluid has flowed around the cold spiral pathways (1d) and gained heat it must exit the heat exchanger (HE). This is done the same way in which the fluid enters the heat exchanger (HE). The fluid exiting the cold spiral fluid pathways (1d) goes into the cold fluid outer manifolds (1e) which distribute the fluid to the cold outer route paths (1f) that then carry the fluid to the cold fluid outlet (1g) where it re-combines into the bulk cold fluid flow and exits the heat exchanger (HE).

The hot fluid flow in this method follows the inverted path of the cold fluid. That is, it enters on the outside of the heat exchanger and leaves at the center. By way of example, and consistent with that shown in FIGS. 4-6, the hot fluid enters the device through the cold fluid inlet (2a), e.g., which is a tubular section near the outer part of the device. The hot fluid inlet (2a) breaks the bulk fluid flow up into multiple smaller pathways that comprise the hot inner route paths (2b), which carry the fluid to the hot inner manifold (2c) and distribute the fluid to the hot spiral fluid pathways (2d), e.g. where the heat exchange occurs. After the hot fluid has flowed around the hot spiral pathways (2d) and gained heat it must exit the heat exchanger (HE). This is done the same way in which the fluid enters the heat exchanger (HE). The fluid exiting the hot spiral fluid pathways (2d) goes into the hot fluid outer manifolds (2e) which distribute the fluid to the hot outer route paths (2f) that then carry the fluid to the hot fluid outlet (2g) where it re-combines into the bulk hot fluid flow and exits the heat exchanger (HE).

FIGS. 7-12

FIGS. 7-12 show a second method/technique that has the following components for each fluid path (3) and (4): A cold/hot inlet/chamber (3a, 4a), a cold/hot inner/inlet channeling block channel (3b, 4b), a spiral fluid pathway having cold and hot spiral fluid pathways (3c, 4c) flowing through the heat exchanger, a cold/hot outer/outlet channeling block channel (3d, 4d), and a cold/hot fluid outlet/chamber (3e, 4e).

This method uses a feature which will be referred to as at least one channeling block generally indicated as (5). The channeling block (5) takes fluid from a cold/hot fluid inlet/chamber (3a, 4a) and routes it to the appropriate spiral fluid pathways (3c, 4c), or takes fluid from the spiral fluid pathways (3c, 4c) and directs it to a cold/hot fluid outlet/chamber (3e, 4e). The channeling block (5) may be made of, or include, a multitude of diagonal paths which are angled relative to the spiral fluid pathways (3c, 4c), such that they connect a respective cold/hot chamber (5a, 5b) containing the appropriate cold/hot fluid for providing to/from the spiral pathways (3c, 4c) and the cold/hot fluid inlet (3a, 4a) or cold/hot fluid outlet (3e, 4e). By way of example, and consistent with that shown in FIG. 12, The channeling block (5) has a top portion (5a) which is exposed to one fluid (e.g. the cold fluid) and a bottom portion (5b) which is exposed to the other fluid (e.g., the hot fluid). The top portion (5a) and bottom portion (5b) have respective faces (5a', 5b') that are angled in opposite directions, and there are first respective channels (5a") going through the channeling block (5) that run diagonally downward from the top face (5a') into every other pathway row of the spiral fluid pathway 3c), and second respective channels (5b") that run upward from the bottom face (5b') into the remaining pathway rows of the spiral fluid pathway (4c); thus routing the cold/hot fluid in a manner that alternates the fluid every pathway row in the spiral pathway so as to form the cold and hot spiral fluid pathways (3c, 4c).

Using this method the cold fluid enters through a cold fluid inlet/chamber (3a), then enters a cold inlet channeling block channel (3b), is routed into every other pathway row that form the cold spiral fluid pathway (3c), flows inwardly until it reaches the cold outlet channeling block channel (3d), and is directed to the cold fluid outlet/chamber (3e). Similarly, the hot fluid enters through a hot fluid inlet/chamber (4a), then enters a hot inlet channeling block channel (4b), is routed into every other pathway row that form the hot spiral fluid pathway (4c), flows inwardly until it reaches the hot outlet channeling block channel (4d), and is directed to the hot fluid outlet/chamber (4e). By way of example, the embodiment in FIGS. 7-12 is disclosed with cold-to-hot counterflow, e.g., where the cold water enters from an outer peripheral part of the heat exchanger, and hot water enters from the central part of the heat exchanger. However, consistent with that set forth above, embodiments are envisioned, and the scope of the scope of the invention is intended to include implementations/embodiments, e.g. where the hot fluid and cold fluid are being routed through the heat exchanger in a counterflow arrangement with the cold fluid being routed from the inside of the heat exchanger, flowing outwardly towards the outside thereof in the cold fluid path, and the hot fluid being routed from the outside, and flowing inwardly towards the center part in the hot fluid path.

In effect, the channeling block channels (3b, 4b, 3d, 4d) are configured as respective manifolds. For example, the channeling block channel (3b) is configured to distribute or multiplex cold fluid flowing from the cold fluid inlet/chamber (3a) into the cold spiral fluid pathway (3c); and the channeling block channel (4b) is configured to distribute or multiplex hot fluid flowing from the hot fluid inlet/chamber (4a) into the hot spiral fluid pathway (4c). In contrast, the channeling block channel (3d) is configured to distribute or demultiplex cold fluid flowing from the cold spiral fluid pathway (3c) to the cold fluid outlet/chamber (3e); and the channeling block channel (4d) is configured to distribute or demultiplex hot fluid flowing from the hot spiral fluid pathway (4c) to the hot fluid outlet/chamber (4e).

Manifolds

In fluid mechanics, as one skilled in the art would appreciate, a manifold is understood to be a fluid distribution device for distributing a fluid depending on the direction of the fluid flow. For example, the fluid distribution device may include, or take the fold of, a wide and/or larger pipe, chamber or channel coupled to small pipes or chambers for distributing, multiplexing or demultiplexing the fluid. Fluid flowing from the wide and/or larger pipe, chamber or channel in one direction is distributed or multiplexed into the small pipes or chambers. In comparison, fluid flowing from the small pipes or chambers in an opposite direction is distributed or demultiplexed to the wide and/or larger pipe, chamber or channel.

Additive Manufacturing Process

By way of example, the embodiments disclosed in FIGS. 1-12 may be implemented using one or more additive manufacturing processes that are known in the art.

As one skilled in the art would appreciate, additive manufacturing refers to a process by which digital 3D design data is used to build up a component in layers by depositing material. The term "3D printing" is increasingly used as a synonym for additive manufacturing.

The additive manufacturing process is very well suited for making or manufacturing complicated 3 dimensional mechanical structures, e.g., including an interwoven, checker board or honeycomb structural implementation.

By way of example, different types and kinds of additive manufacturing techniques are set forth below:

Additive Manufacturing (AM)

Techniques for implementing additive manufacturing (AM) are known in the art, and the scope of the invention is not intended to be limited to any particular type or kind thereof either now known or later developed in the future.

The following is a brief description of techniques for implementing AM that are known in the art.

By way of example, AM is understood to be a transformative approach to industrial production that enables the creation of lighter, stronger parts and systems. It is another technological advancement made possible by the transition from analog to digital processes. In recent decades, communications, imaging, architecture and engineering have all undergone their own digital revolutions. Now, AM can bring digital flexibility and efficiency to manufacturing operations.

By way of example, AM may be implemented using data computer-aided-design (CAD) software or 3D object scanners to direct hardware to deposit material, layer upon layer, in precise geometric shapes. As its name implies, AM adds material to create an object. In contrast, when one creates an object by traditional means, it is often necessary to remove material through milling, machining, carving, shaping or other means.

Although the terms "3D printing" and "rapid prototyping" may typically be used to discuss AM, each process is actually understood to be a subset of AM in general. AM has been around for several decades. In the right applications, AM delivers a trifecta of improved performance, complex geometries and simplified fabrication. As a result, opportunities abound for those who actively embrace AM. The term "AM" references technologies that grow three-dimensional objects one superfine layer at a time. Each successive layer bonds to the preceding layer of melted or partially melted material. It is possible to use different substances for layering material, including metal powder, thermoplastics, ceramics, composites, glass and even edibles like chocolate.

By way of example, objects may be digitally defined by the computer-aided-design (CAD) software that is used to create .stl files that essentially "slice" the object into ultra-thin layers. This information guides the path of a nozzle or print head as it precisely deposits material upon the preceding layer. Or, a laser or electron beam selectively melts or partially melts in a bed of powdered material. As materials cool or are cured, they fuse together to form a three-dimensional object.

The journey from .stl file to 3D object is revolutionizing manufacturing. Gone are the intermediary steps, like the creation of molds or dies, that cost time and money. There are a variety of different AM processes, e.g., including the following:

Material Extrusion: Material extrusion is one of the most well-known AM processes. Spooled polymers are extruded, or drawn through a heated nozzle mounted on a movable arm. The nozzle moves horizontally while the bed moves vertically, allowing the melted material to be built layer after layer. Proper adhesion between layers occurs through precise temperature control or the use of chemical bonding agents.

Directed Energy Deposition (DED): The process of DED is similar to material extrusion, although it can be used with a wider variety of materials, including polymers, ceramics and metals. For example, an electron beam gun or laser mounted on a four- or five-axis arm may be configured to melt either wire or filament feedstock or powder.

Material Jetting: With material jetting, a print head moves back and forth, much like the head on a 2D inkjet printer. However, it typically moves on x-, y- and z-axes to create 3D objects. Layers harden as they cool or are cured by ultraviolet light.

Binder Jetting: The binder jetting process is similar to material jetting, except that the print head lays down alternate layers of powdered material and a liquid binder.

Sheet Lamination: Laminated object manufacturing (LOM) and ultrasonic AM (UAM) are two sheet lamination methods. LOM uses alternate layers of paper and adhesive, while UAM employs thin metal sheets conjoined through ultrasonic welding. LOM excels at creating objects ideal for visual or aesthetic modeling. UAM is a relatively low-temperature, low-energy process used with various metals, including titanium, stainless steel and aluminum.

Vat Polymerization: With vat photopolymerization, an object is created in a vat of a liquid resin photopolymer. A process called photopolymerization cures each microfine resin layer using ultraviolet (UV) light precisely directed by mirrors.

Powder Bed Fusion: Powder Bed Fusion (PBF) technology is used in a variety of AM processes, including direct metal laser sintering (DMLS), selective laser sintering (SLS), selective heat sintering (SHS), electron beam melting (EBM) and direct metal laser melting (DMLM). These systems use lasers, electron beams or thermal print heads to melt or partially melt ultra-fine layers of material in a three-dimensional space. As the process concludes, excess powder is blasted away from the object.

AM Technologies

Sintering is the process of creating a solid mass using heat without liquefying it. Sintering is similar to traditional 2D photocopying, where toner is selectively melted to form an image on paper.

Within DMLS, a laser sinters each layer of metal powder so that the metal particles adhere to one another. DMLS machines produce high-resolution objects with desirable surface features and required mechanical properties. With SLS, a laser sinters thermoplastic powders to cause particles to adhere to one another.

In contrast, materials are fully melted in the DMLM and EBM processes. With DMLM, a laser completely melts each layer of metal powder while EBM uses high-power electron beams to melt the metal powder. Both technologies are ideal for manufacturing dense, non-porous objects.

Stereolithography (SLA) uses photopolymerization to print ceramic objects. The process employs a UV laser selectively fired into a vat of photopolymer resin. The UV-curable resins produce torque-resistant parts that can withstand extreme temperatures.

AM Materials

It is possible to use many different materials to create 3D-printed objects. AM technology fabricates jet engine parts from advanced metal alloys, and it also creates chocolate treats and other food items.

By way of examples, AM materials include the following:

Thermoplastics: To date, thermoplastic polymers remain the most popular class of AM materials. Acrylonitrile butadiene styrene (ABS), polylactic acid (PLA) and polycarbonate (PC) each offer distinct advantages in different applications. Water-soluble polyvinyl alcohol (PVA) is typically used to create temporary support structures, which are later dissolved away.

Metals: Many different metals and metal alloys are used in AM, from precious metals like gold and silver to strategic metals like stainless steel and titanium.

Ceramics: A variety of ceramics have also been used in AM, including zirconia, alumina and tricalcium phosphate. Also, alternate layers of powdered glass and adhesive are baked together to create entirely new classes of glass products.

Biochemicals: Biochemical healthcare applications include the use of hardened material from silicon, calcium phosphate and zinc to support bone structures as new bone growth occurs. Researchers are also exploring the use of bio-inks fabricated from stem cells to form everything from blood vessels to bladders and beyond.

AM Advantages

AM allows the creation of lighter, more complex designs that are too difficult or too expensive to build using traditional dies, molds, milling and machining.

AM also provides for rapid prototyping. Since the digital-to-digital process eliminates traditional intermediate steps, it is possible to make alterations on the run. When compared to the relative tedium of traditional prototyping, AM offers a more dynamic, design-driven process.

Whether AM is used for prototyping or production, lead times are frequently reduced. Lead times for certain jet engine parts have been reduced by a year or more. Also, parts once created from multiple assembled pieces are now fabricated as a single, assembly-free object.

In designing everything from bridges to skyscrapers, engineers have long sought to minimize weight while maximizing strength. With AM, designers realize the dream of utilizing organic structures to greatly reduce the weight of objects.

Advantages of using the AM process for implementing the present invention disclosed herein may include substantially improved heat exchange efficiency when compared with prior art heat exchangers.

Complex Geometries

The AM technology enables engineers to design parts that incorporate complexity that is not possible using other methods. Intricate features, such as conformal cooling passages, can be incorporated directly into a design. Parts that previously required assembly and welding or brazing of multiple pieces can now be grown as a single part, which makes for greater strength and durability. Designers are no longer restricted to the limitations of traditional machines and can create parts with greater design freedom.

Time Savings

AM is ideal for getting prototypes made quickly. Parts are manufactured directly from a 3D CAD file, which eliminates the cost and lengthy process of having fixtures or dies created. Plus, changes can be made mid-stream with virtually no interruption in the process.

Weight Savings

By incorporating organic structures into designs, designers can eliminate substantial weight while maintaining the part's strength and integrity.

Directed Energy Deposition (DED)

DED covers a range of terminologies, e.g., including: 'Laser engineered net shaping, directed light fabrication, direct metal deposition, 3D laser cladding'. It is a more complex printing process commonly used to repair or add additional material to existing components (Gibson et al., 2010).

A typical DED machine consists of a nozzle mounted on a multi axis arm, which deposits melted material onto the specified surface, where it solidifies. The process is similar in principle to material extrusion, but the nozzle can move in multiple directions and is not fixed to a specific axis. The material, which can be deposited from any angle due to 4 and 5 axis machines, is melted upon deposition with a laser or electron beam. The process can be used with polymers, ceramics but is typically used with metals, in the form of either powder or wire.

Typical applications include repairing and maintaining structural parts.

By way of example, apparatus for implementing Direct Energy Deposition—Step by Step, may include as follows:
1. A 4 or 5 axis arm with nozzle moves around a fixed object.
2. Material is deposited from the nozzle onto existing surfaces of the object.
3. Material is either provided in wire or powder form.
4. Material is melted using a laser, electron beam or plasma arc upon deposition.
5. Further material is added layer by layer and solidifies, creating or repairing new material features on the existing object.

The DED process uses material in wire or powder form. Wire is less accurate due to the nature of a pre-formed shape but is more material efficient when compared to powder (Gibson et al., 2010), as only required material is used. The method of material melting varies between a laser, an electron beam or plasma arc, all within a controlled chamber where the atmosphere has reduced oxygen levels. With 4 or 5 axis machines, the movement of the feed head will not change the flow rate of material, compared to fixed, vertical deposition (Gibson et al., 2010).

Whilst in most cases, it is the arm that moves and the object remains in a fixed position, this can be reversed and a platform could be moved instead and the arm remain in a fixed position. The choice will depend on the exact application and object being printed. Material cooling times are very fast, typically between 1000-5000 degrees Celsius/second (Gibson et al., 2010). The cooling time will in turn affect the final grain structure of the deposited material, although the overlapping of material must also be considered, where the grain structure is changed as the overlapping can cause re-melting to occur, resulting in a uniform but alternating micro-structure. Typical layer thicknesses of 0.25 mm to 0.5 mm (Gibson et al., 2010).

AM Patent Documents

The following is a list of patent documents, e.g., including US patent applications and issued US patent, that disclose AM technology, are all incorporated by reference in their entirety, and include the following:

U.S. Pat. Nos. 4,575,330; 8,029,501; 9,884,455; 9,450,311 and 9,937,665.

US Patent publication nos. 2004/0230117; 2007/0084839; 2012/0041428; 2015/0174822; 2016/0298213; 2017/0021565; 2017/0028631; 2017/0182561; 2017/0182595; 2017/0184108; 2017/0225403; 2017/0261087; 2017/0287685; and 2017/0312821.

The incorporation by references of the aforementioned patent documents include the incorporation by reference of all the US patent applications and issued US patent either referenced or cited therein.

Possible Applications

By way of example, one possible applications may include: Heat Exchangers

However, the present invention may also be used in almost any situation in which it is desirable to change the temperature of a fluid. By way of example, possible applications may include one or more of the following: aerospace, viscous fluid processing, corrosive chemical processing, high temperature applications.

The Scope of the Invention

While the invention has been described with reference to an exemplary embodiment, it will be understood by those skilled in the art that various changes may be made and equivalents may be substituted for elements thereof without departing from the scope of the invention. In addition, may modifications may be made to adapt a particular situation or material to the teachings of the invention without departing from the essential scope thereof. Therefore, it is intended that the invention not be limited to the particular embodiment(s) disclosed herein as the best mode contemplated for carrying out this invention.

What is claimed is:

1. A heat exchanger comprising:
    a cold fluid inlet manifold configured to receive first fluid and provide first inlet manifold fluid;
    a hot fluid inlet manifold configured to receive second fluid and provide second inlet manifold fluid, the first fluid having a colder temperature than the second fluid; and
    an integral spiral fluid pathway having pathway rows and columns with cold spiral fluid pathways and hot spiral fluid pathways interwoven in relation to one another in alternating pathway rows and columns, the cold spiral fluid pathways being made or manufactured in every other pathway row and the hot spiral fluid pathways being made or manufactured in every other remaining pathway row, the cold spiral fluid pathways being made or manufactured in every other pathway column and the hot spiral fluid pathways in every other remaining pathway column, so that the cold spiral fluid pathways are configured in every other pathway row and column and the hot spiral fluid pathways are configured in every other remaining pathway row and column, the cold spiral fluid pathways configured to receive the first inlet manifold fluid and provide first spiral pathway fluid, and the hot spiral fluid pathways configured to receive the second inlet manifold fluid and provide second spiral pathway fluid, the cold spiral fluid pathways and the hot spiral fluid pathways being configured in relation to one another to exchange heat between the first spiral pathway fluid and the second spiral pathway fluid so that the second spiral pathway fluid warms the first spiral pathway fluid, and vice versa, the heat exchanger being made or manufactured in whole or in part using an additive manufacturing process; wherein the cold fluid inlet manifold comprises a cold inlet channeling block having an inlet portion with an inlet face configured to receive the first fluid and provide the first fluid to alternating rows and columns of the cold spiral fluid pathways;

the hot fluid inlet manifold comprises a hot inlet channeling block having a corresponding inlet portion with a corresponding inlet face configured to receive the second fluid and provide the second fluid to alternating rows and columns of the hot spiral fluid pathways;

the heat exchanger comprises
- a cold fluid outlet manifold including a cold outlet channeling block having an outlet portion with an outlet face configured to receive the first spiral pathway fluid from the cold spiral fluid pathways and provide the first spiral pathway fluid, and
- a hot fluid outlet manifold including a hot outlet channeling block having a corresponding outlet portion with a corresponding outlet face configured to receive the second spiral pathway fluid from the hot spiral fluid pathways and provide the second spiral pathway fluid;

the inlet face and the corresponding inlet face are configured with respective channels/openings formed therein to allow fluid flow;

the inlet face of the cold inlet channeling block is angled in relation to the corresponding outlet face of the hot outlet channeling block;

the outlet face and the corresponding outlet face are configured with respective corresponding channels/openings formed therein to allow fluid flow; and the corresponding inlet face of the hot inlet channeling block is angled in relation to the outlet face of the cold outlet channeling block.

2. A heat exchanger according to claim 1, wherein the cold fluid outlet manifold is configured to receive the first spiral pathway fluid and provide first outlet manifold fluid, including to a cold fluid outlet; and the hot fluid outlet manifold is configured to receive the second spiral pathway fluid and provide second outlet manifold fluid, including to a hot fluid outlet.

3. A heat exchanger according to claim 1, wherein the heat exchanger comprises cold inlet route paths or pathways configured to receive the first fluid and provide first inlet route paths or pathways fluid; and the cold fluid inlet manifold is configured to receive the first inlet route paths or pathways fluid as the first fluid from the cold inlet route paths or pathways.

4. A heat exchanger according to claim 1, wherein the heat exchanger comprises hot inlet route paths or pathways configured to receive the second fluid and provide second inlet route paths or pathways fluid; and the hot fluid inlet manifold is configured to receive the second inlet route paths or pathways fluid as the second fluid from the hot inlet route paths or pathways.

* * * * *